March 25, 1941.  G. A. RUBISSOW  2,235,850
THROTTLE ACTUATING DEVICE
Filed July 7, 1937  3 Sheets-Sheet 1

INVENTOR.
Georges A. Rubissow

March 25, 1941.  G. A. RUBISSOW  2,235,850

THROTTLE ACTUATING DEVICE

Filed July 7, 1937  3 Sheets-Sheet 2

INVENTOR.

George A. Rubissow.

March 25, 1941.  G. A. RUBISSOW  2,235,850

THROTTLE ACTUATING DEVICE

Filed July 7, 1937  3 Sheets-Sheet 3

INVENTOR.

Georges A. Rubissow.

Patented Mar. 25, 1941

2,235,850

UNITED STATES PATENT OFFICE 2,235,850

THROTTLE ACTUATING DEVICE

George Alexis Rubissow, New York, N. Y.

Application July 7, 1937, Serial No. 152,383
In Great Britain March 5, 1937

10 Claims. (Cl. 74—513)

This invention relates to the operation of the throttle of an internal combustion engine.

As is well known, the throttle of an internal combustion engine is usually actuated by a pedal. This pedal is normally in such a position as to be capable of being operated by intentional and continuous pressure of the foot, generally the right foot, and the pressure thereon has to be varied according to the movement of the throttle, and consequently the speed of the engine desired.

It is well known that during recent years, when a large number of people of both sexes drive motor vehicles, driving, especially when it is necessary to do this for several hours in succession every day, very often seriously affects the drivers, causing, amongst other things, cramp in the foot, tiring of the foot, various effects on the nerves and in some cases even complete paralysis of the foot or of the sciatic nerves and of the muscles.

There is no doubt that a good deal, if not all, of these diseases are due to the defective arrangement of the throttle actuating mechanism. Although from a mechanical point of view the arrangement is satisfactory, it is nevertheless entirely wrong or even deleterious in its reaction on the various parts of the human body, such as the foot, nerves, muscles and so forth.

While driving a car the attention of the driver is so concentrated on the driving that he does not realize the deleterious action of the permanent tension of the nerves and muscles of the foot which is acting on the accelerator. When operating the clutch or brake pedals this disadvantage does not occur as these operations are only effected periodically and briefly by the application of a thrust and subsequent release. This thrust does not have any abnormal effect on the foot.

Quite different considerations, however, apply in connection with the operation of the throttle as in this case the conditions become abnormal.

As an illustration it may be mentioned that if a driver held his foot on the accelerator pedal while the car was stationary and the engine stopped the nerves and muscles of his foot would become so strained that after an hour or so he would be unable to operate the accelerator. Whilst the car is running this is not noticed as the driver must give his whole attention to driving so that the tension whilst present and existing, is overlooked or forgotten and dominated by the safety attention. Consequently, after driving for a considerable time, which may be several months and in some cases years, drivers frequently suffer from serious cramps, rheumatic diseases, paralysis and so forth of the muscles, nerves and so forth of the foot.

The principal object of the present invention is to overcome these disadvantages and to provide means whereby the foot, while actuating the accelerator pedal, can always remain in a normal position, so that during the operation of the accelerator the tension of the muscles or nerves of the foot is eliminated or partly eliminated. This result can only be obtained by the provision of mechanical means which eliminate this tension.

The mechanical means ordinarily employed which are fitted on modern cars for actuating the throttle by hand require two operations, one for setting the throttle position, that is to say for opening or closing the same, and a second operation for reversing the first operation. Such means are consequently not entirely satisfactory and may even be dangerous as they are not sufficiently rapid in operation, have to be operated in both directions and are not automatic.

The present invention is adapted to overcome the defects of these mechanical devices while retaining any of the good qualities associated therewith.

All the figures show diagrammatically different aspects of this invention. Figures 1 and 2 represent side views partly in cross-section showing the forces acting on the elements involved. Figures 3, 4, 6, 8, 9, 10, 11, 12, 14, 15, 16, 17, 22, 24, and 25 represent side views partly in cross-section of different aspects of the devices.

In the drawings, wherein like reference characters refer to like parts throughout the several views:

Figure 1 is a schematical front view showing the forces of the accelerator system and the foot which are present when the foot is in a certain position.

Figure 1:
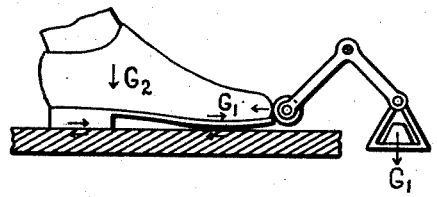
Figure 2:
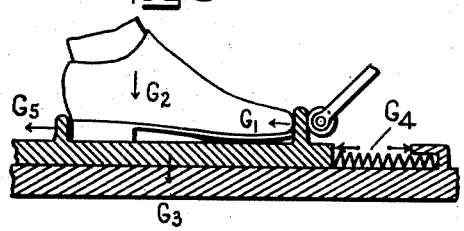

Figure 2 respresents the same aspect as Figure 1 but a heavy sliding member is introduced to increase the friction.

Figure 3:
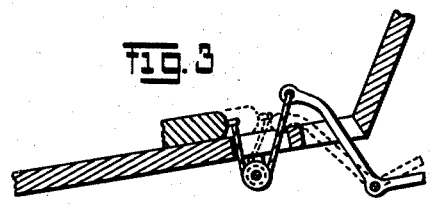

Figure 3 is a diagrammatical side view of a small sliding member $u$ placed on the flooring $b$, a roller $w$ rigidly affixed in respect to the flooring, a flexible connection $t_1$ attached to the said sliding member $u$ and to the lever $l$ and an opening $o$ provided in the flooring to permit the movement of the flexible connection.

Figure 4:
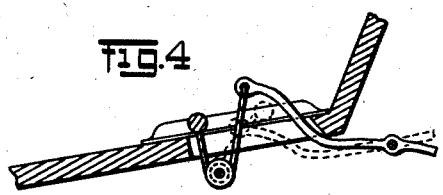

Figure 4 is a side view partly in section of a roller $u$ connected with a flexible connection $t_1$ passing through a fixed roller or a guideway $W$ and attached to the lever $l$ of the accelerator system or to the accelerator pedal.

Figure 5:
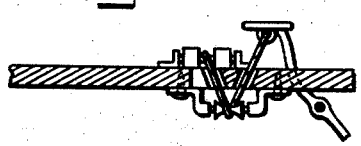

Figure 5 is a front view of the device shown in Figure 4.

Figure 6:
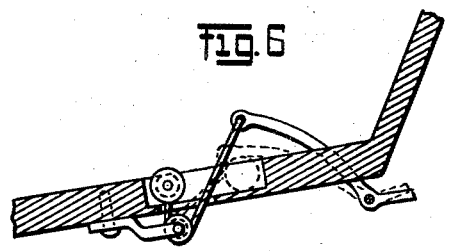

Figure 6 represents another aspect of the device shown in Figure 4.

Figure 7:
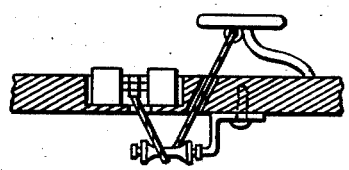
Figures 5, 7, 13, 18, 20, 21 and 23 represent cross-sectional views.

Figure 7 is a device similar to that shown in Figure 4 wherein the roller used is rolled on the surface of the flooring.

Figure 8:
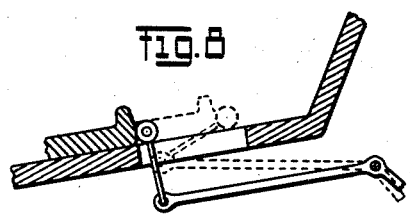

Figure 8 is another aspect of the device consisting of a sliding member $g$ contacting a roller $u$ connected to the lever $l$ by means of connecting means $t_1$ and without assistance of a roller. It may be possible to use a flexible connection $t_1$ or a rigid connection which in this case has to be mounted pivotally.

Figure 9:
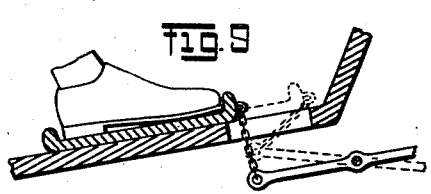

Figure 9 is a sliding member $g$ connected by means of a chain or a flexible connection with the lever of the throttle.

Figure 10:
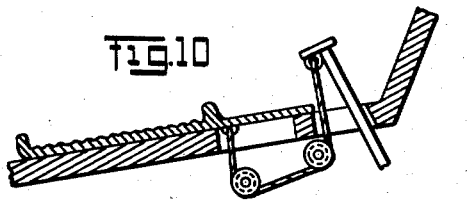

Figure 10 is a sliding member $g$, the upper part of which covers the holes $o$ cut out in the floor, through which holes the flexible connection $t_1$ passing through two rollers or guideways $W_1$ and $W_2$ is connected with the lever $l$ of the throttle.

Figure 11:
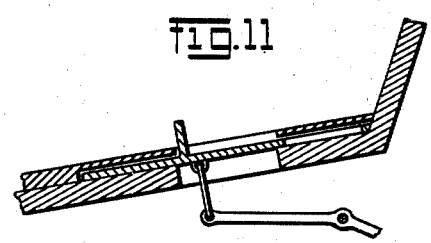

Figure 11 is a sliding member $u$ which is installed inside the floor $b$ so that only the arresting part or the part pushing the sliding member rises through the cut out guideway.

Figure 12:
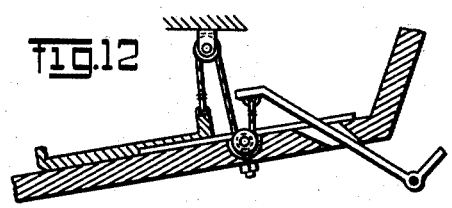
Figure 13:
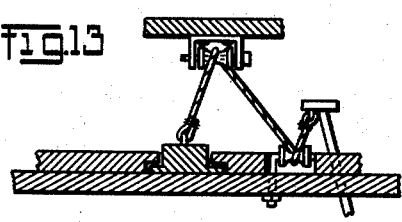

Figures 12 and 13 represent a sliding member $g$ and a flexible connection $t_1$ actuating the throttle pedal.

Figure 14:
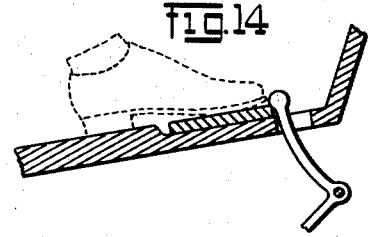

Figure 14 is a lever arrangement combined with a sliding member $g_1$.

Figure 15:
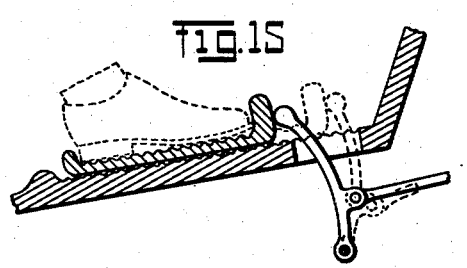

Figure 15 is a lever arrangement combined with the sliding member $g$ having arresting elements $i$ and corrugated surfaces.

Figure 16:
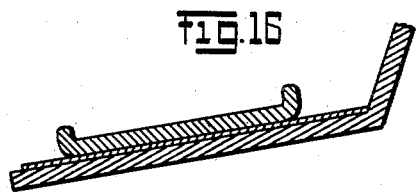

Figure 16 provides a sliding member $g$ which includes magnetic metals. If desired, the flooring $b$ may also be provided with magnetic metals.

Figure 17:
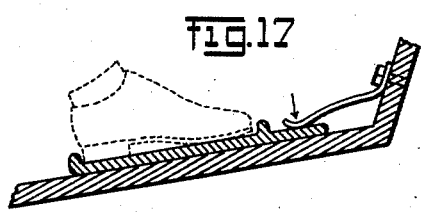

Figure 17 is a sliding member with arresting means and a spring $s$ which increases the adherence of the sliding member to the floor.

Figure 18:

Figure 18 is a cross-sectional view of Figure 17.

Figure 19:
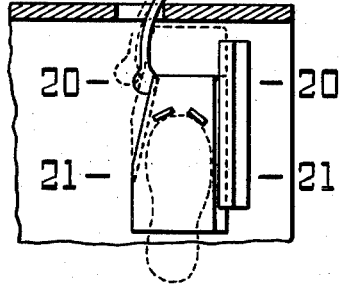
Figures 19 and 26 represent top plan views of the device.

Figure 19 represents a sliding member $g$, a guide means $p$ and a lever $l$.

Figure 20:

Figure 20 represents the cross-section 19—19 of Figure 19.

Figure 21:
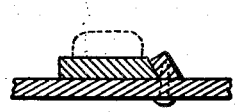

Figure 21 represents the cross-section 19a—19a of Figure 19.

Figure 22:
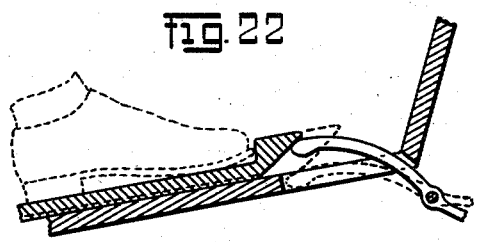

Figure 22 is a sliding member $g$ having a cut out guideway in front, upon the surface of which the throttle $d$ of the pedal $l$ moves.

Figure 23:
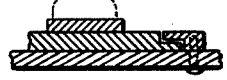

Figure 23 is a cross-section 22—22 of Figure 22.

Figure 24:
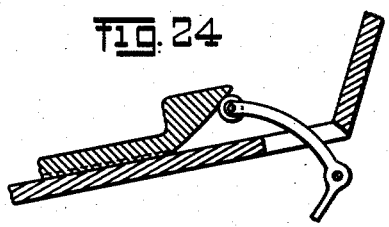

Figure 24 is a throttle having a roller on the end to facilitate the action when in contact with the guideway of the sliding member.

Figure 26:
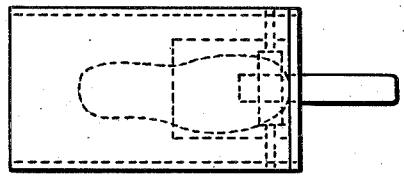
Figure 25:
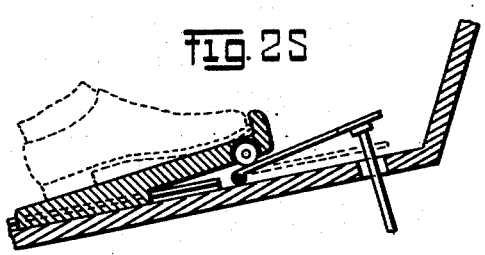

Figures 25 and 26 represent a sliding member $g$ having a roller on the pedal $n$ attached to the throttle lever $l$ and the flooring provided with guide means.

Figure 27:
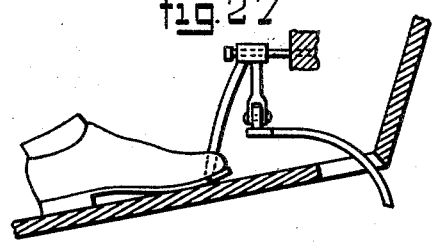
Figures 27 and 29 are side views of a lever arrangement.
Figure 28:
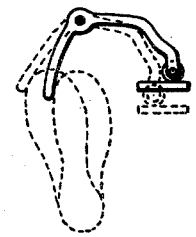
Figure 28 is a plan view of Figure 27.
Figure 29:
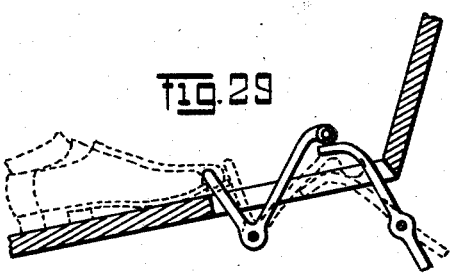

Figures 27, 28 and 29 represent a special lever arrangement, not flexible, acting on the surface of the existing accelerator pedal $n$. The levers are rigidly affixed by an axle $c_1$.

The result of the present invention is achieved by using the whole or a portion of the frictional force between the sole or heel, or both the sole and heel, of the driver's footwear and a surface on which the foot normally rests by its own weight in such a manner that almost no tension will be applied to the muscles or nerves of the foot, while when the foot is removed from the said surface, the throttle is free to return to its normal position.

It is to be clearly understood that the essential part of this invention consists in providing mechanical means or devices which balance two groups of forces, $G_1$ and $G_2$, in favor of the second group, i. e. $G_2 > G_1$. The first group of forces, $G_1$, is composed by the reaction of the throttle arrangement (forces, stresses and so forth), including the return means (springs, resilient elements, counterweights and so forth) and by the total reaction of the transmission devices between the accelerator pedal and the throttle devices arrangement. The second group of forces, $G_2$, is composed by the useful utilizable weight of the foot (part of the leg, foot, footwear and so forth), including the total of frictional forces created between the footowear and the floor.

$G_1$ equals the reaction of all the elements of transmission, pedals, levers, shafts and so forth from the accelerator pedal to the throttle, also including the reaction of the specially added return means, which we will call in certain cases where this must be distinguished, $G_4$, such as springs, resilient means, counter-weights etc., provided particularly for the return of the throttle and/or accelerator.

The force $G_2$ equals the active weight of the active part of the human body and serves to keep the throttle in the required position, this weight being composed by the body, leg, foot, clothes, footwear, the active weight of which rests on the floor or a part thereof and contacts the accelerator pedal. This weight produces the totality of forces of friction created between the footwear and the throttle (in cases when the footwear contacts the throttle) and between the footwear and the floor. It must be understood that in this force $G_2$ is not included the intensional pressure which, ($G_5$) may be provided by will power and the use of the muscles in addition to the said weight of the foot resting without any tension on the floor.

By a comparison of these two groups, $G_1$ and $G_2$, it will be seen that the most essential point is the total sum of frictions available, the friction between the floor and the footwear, plus the friction between the accelerator pedal and the footwear (if such exists). These two frictions equal a function of $G_2$.

It is well known that the friction $f$ is directly proportional to the pressure existing between two surfaces and secondly that the friction is independent of the area of the active surfaces, that is to say it is dependent on the potential intensity of the operating pressure or its reaction.

The coefficient of friction $c$ equals $$\frac{R}{G}$$

where $R$ is the friction and $G$ is the weight of the body producing the pressure between the surfaces; applying to the present description $G$ equals $G_2$.

It is also known that the friction $$f = c \sqrt{\frac{1.03}{G}}$$

As an example, we take for instance the case of friction between metal surfaces and leather. It is known that in the case of leather on steel or leather on iron, coefficient c is equal to 0.55 to 0.62—we assume 0.59.

In the present case $G_1$ is equal to $G_2$ which, as described in the foregoing, is the active weight of the part of the body, part of the leg, part of the foot and footwear and so forth, acting on the accelerator pedal and the floor. If it is assumed, for example, that this weight is equal to at least $\frac{1}{30}$ of the total weight of the driver's body, then it can easily be assumed that $\frac{1}{30}$ of 120 lbs. equals 4 lbs. There is thus obtained the equation $$f = 0.59 . \sqrt{\frac{1.03}{4}} = \text{approximately } 2.2 \text{ lbs.}$$

This means that the driver will have at his disposal and without any tension in the muscles, and solely by reason of the proper active available weight of the part of the body, footwear, etc. which is used for keeping the throttle in a definite position, at least a force of 2.2 lbs.

It is now necessary to see whether this force is large enough to counter-balance the existing reaction or the total of the forces included or produced in the accelerating devices arrangement, as indicated above by $G_1$ and in certain cases $G_1$ plus $G_4$.

The force $G_1$ can be very readily observed, for example by placing a weight on the accelerator and by gradually increasing this weight, there will be obtained a moment at which the accelerator is depressed by this weight and pressed against the floor. Such a weight is in the modern automotive industry generally about 1 lb. minimum and the maximum is about 8 lbs. when the throttle is operating under inefficient working conditions. These figures are only to be regarded as examples.

If it is now assumed that $G_1$ is 2 lb. then $f$ when equal to 2.2 lb., as indicated in the foregoing, is sufficient to counter-balance by friction the total frictional forces of the accelerator mechanism, $c.G_2 > G_1$. In such a case the driver can operate the device forming the subject of the present invention without even utilizing any intentional muscular effort.

This example clearly shows how easy it is to select a device whereby the necessary friction will be available for operating the throttle device arrangement.

From the practical point of view it will always be advisable that $c.G_2$ will be bigger than $G_1$. However, there may be drivers who would prefer that $c.G_2$ will be equal to $G_1$. That is also claimed and covered by my invention, and finally there may be a driver who will prefer that $c.G_2$ will be less than $G_1$ and this is also covered by my invention.

In certain cases when it is desired to increase $G_2$ independent of the weights of the human body and footwear, my invention foresees the improvement which is realized by means of introducing between the footwear and the floor, a sliding member which has its own weight, $G_3$, which in this case will be added to $G_2$, so that the total weight which creates the friction will be $G_2$ plus $G_3$.

In this case this sliding member has the weight of $G_3$ and may be constructed in one or more parts and arranged as hereinafter described. This sliding member with or without guideways may be connected to the throttle by suitable lever, chain, eccentric or other transmission device or mechanism so that when moved in one direction it opens the throttle and when moved in the opposite direction it closes the throttle. The sliding member may be arranged to be operated either by the toe or heel of the foot or feet.

The sliding member may also be arranged on the side of the foot so that by rocking the foot to one side the throttle may be actuated.

The device as above described may be returned into its in-operative position by any suitable means such as one or more springs, resilient means, rubber, counter-weights or the like of which the strength is such that it is completely or almost completely balanced by the friction created between the foot and the floor on which it is resting by its own weight without additional pressure, and the friction created between the foot and the device on which it rests whereby the device is prevented from returning into the in-operative position as long as there is sufficient friction between the foot and the floor and between the foot and the device to hold it in its operating position. The device may be so arranged that it is substantially on a level with the floor or projects slightly above the surface thereof.

For the purpose of increasing the friction between the footwear, the device and the floor, friction may be increased wholly or in part by means of covering the footwear and/or device and/or floor or any combination of them by rubber, wood, cork or the like, or even of metal, or if so desired the said surface or surfaces whether covered or not may be suitably corrugated or roughened for the purpose of increasing the friction.

The shaft may also be actuated by a small carriage or a sliding body which can be moved to and fro by the driver's foot. This carriage or sliding body may be divided into sections if so desired so as to be used by one or both feet or by a second driver. By means of the device as above described the foot of the driver is always in a natural position and without straining the muscles or the like of the foot or leg the throttle is operated by moving the foot forward or backward or laterally, and when one foot becomes tired the device can be operated by the other foot.

The portion of the floor adjacent to the sliding member may be in certain particular cases polished whereas the adjacent portion may be arranged to provide a good frictional surface so as to prevent the foot from slipping while actuating the throttle and holding it in the desired position.

Another method of construction for application to existing throttle actuating mechanism consists in the provision of a lever, levers or other transmission mechanisms which are pivotally mounted in front or on the side of or near the driver's foot, one end being located in such a position that it extends near the floor so that it can be actuated by the driver's toe or heel whereas the other end is suitably connected to the accelerator.

Another important aspect in the construction of the invention may reside in the combination of any of the arrangements above described, such as rollers, segments, parts thereof, sliding members, and so forth, keyed members, pedals, levers and so forth, capable of being pushed and any other suitable device so that for the purpose of increasing the weight, hereinbefore referred to as $G_2$, a suitable additional weight can be added. This result may be obtained in a simple manner, for example by placing a heavy intermediate weight device between the footwear or foot and the accelerator pedal, rollers, segments or the like. When an intermediate weight device of this character is placed for example between the shoe and the roller, in front of, behind, or laterally of the lever or the like, the weight of this device may be selected as required, for example it may be one, two, four, ten pounds or any desired weight. When the driver now moves his foot in a suitable direction, the driver at the same time moves the intermediate weight devices, which latter by its weight increases the friction. In such a case the driver, after having moved the intermediate weight device into the required position, may remove his foot from the intermediate weight device, this weight being then sufficient to keep the accelerator pedal or the various devices above described in the required position until the driver again desires to actuate the devices by applying pressure by means of his foot and thus bringing the throttle or the other mechanism into the new position required or for the purpose of restoring the various mechanisms into a position corresponding to the "ticking over" of the engine.

In connection with the latter example it will be clear that when the foot remains on the intermediate weight device, two sets of friction and two weights act on the accelerator mechanism. The first consists of $G_2$ and $f = c\, G_2$, and the second will be formed by the weight $G_3$, the intermediate weight devices selected as desired. The total friction produced by $G_2$ and this intermediate weight, $G_3$; $f$ will now be equal to $c\, (G_2 \text{ plus } G_3)$.

The sliding member, as described, may be provided with some arresting or guide member forming part of the sliding devices or adapted to it. These arresting devices will aid the foot to push the sliding member forwards, backwards or sideways and they may be of any form and shape.

Another aspect consists in having a sliding member one part of which has a special guideway cut out so that this cut out guideway, which must be in touch with the throttle member by and when moving the throttle member, is forced to follow the contact surface of the throttle which is pressed downwards, upwards or sideways as required. The extreme part of the throttle which is in contact with this guideway of the sliding member may be provided with a roller to diminish the friction of the contact between the throttle and the sliding member.

Another aspect of the invention is the application of any of this description directly to the existing already installed arrangements of the accelerator pedals, as shown in different figures.

Another and one of the most practical aspects of my invention will be an arrangement whereby the throttle or the accelerating pedal or any other lever device of the general throttle arrangement is at least in one of its points connected to the sliding element by a flexible means such as a strip, wire, chain, band of leather, etc., (which means is attached to the sliding element so that when the sliding element is moved it moves at the same time the flexible connection which approaches or recedes from the point of the connection with the throttle arrangement).

In the same aspect of the application of my invention this flexible connection may on its way between the point of attachment to the throttle arrangement and between its other point of attachment with the sliding member pass through at least one roller or similar arrangement, or through a fixed guideway which replaces the roller so that the flexible connection may roll together with the roller with as little friction as possible, or, in other cases, may slide in the guideways with a certain friction. In still other aspects, the said one or more rollers may be placed on different surfaces and under different angles sideways, upwards, downwards or under any angle in the proximity of the throttle devices and the driver.

It may be also so arranged that the end of the flexible connection, instead of being attached directly to the sliding member, is attached also to a roller so that this roller when pushed by the sliding member or when pushed directly by the footwear may be displaced in the required direction and the required space. The said roller may be provided to roll or to slide in guideways or between guideways and it may be of any form and may include special cut out guideways on which the flexible connection may be attached to slide freely by means of a ring or any other suitable arrangement. If required, the flexible connection may be wound upon the roller to decrease as quickly as possible the length of the flexible connection.

Another aspect of the invention is the introduction in any of the described sliding devices of a magnetic metal so that the friction in this case will be increased on account of the additional pressure between the surfaces created by the magnetic attraction. The magnetic metals will be applied in sheets, strips, or in bars, or in any other form inside the sliding member and of the floor or of any of the surfaces. Instead of magnets, electromagnetizing materials may be used.

This invention may be applied to any kind of engine having a throttle lever or accelerator pedal arrangement, especially for cars, tracks, railroads, engines, aeroplanes, boats, etc. In certain cases, as for military application, it may be extremely important that if the driver is hurt the engine may still continue to run and the person near the driver may continue to operate the throttle.

In all of the mentioned aspects the most essential point is that when all these devices described are in operating positions, that is to say removed from the position of "ticking-over" to any other position required for the running of the engine, the retention of these devices in any required position is substantially counter-balanced by the forces produced by the friction created by the active part of the weight of the leg and/or foot, and/or footwear of the driver pressed by resting and contacting against the accelerator pedal and the floor.

My invention is applicable not only for the throttle or accelerator arrangement of any combustion engines, but also for any similar throttle arrangement, as for instance for the electrical machines, a foot-controlling device for the electrical trains or tramways, steam locomotives, etc.

Having now particularly described and ascertained the nature of my said invention and in what manner the said invention operates, I declare to what I claim:

1. A foot-operated device for controlling the position of the accelerator system or the like which comprises a pivoted lever of an appropriate form, one part of which is connected to the accelerator rod or the like, and the other free end of which pivots, remaining substantially adjacent to its displacement area provided on the flooring for the displacement of the sliding member, which sliding member is guided during movement on its corresponding displacement area, said sliding member having at least one abutment for the shoe, a pivoting axle of the said pivoted lever being rigidly affixed with respect to the flooring, a fixed abutment member of any suitable form being affixed rigidly on the flooring at such a distance from the free end of the pivoting lever that when the sliding member resting on the flooring is displaced, a part of the said sliding member always remains engaged between the said abutment member and the free end of the pivoted lever, the sides of the sliding member contacting simultaneously the abutment member and the free end of the pivoted lever during the operation, the dimensions of the lever-arms and the place where the pivoting axle of the pivoted lever being so chosen that the inert-weight of the operator's foot (which inert-weight includes the foot, footwear, and all the freely suspended part of his leg and clothing, and this without any muscular strain being exercised) plus the weight of the sliding member are entirely sufficient to create exclusively by the same, two frictional engagements, one created between the sliding member and its displacement area and another created by the frictional engagement of the sides of the sliding member when engaged between the abutment member and the free end of the pivoting lever, the sum total of these two frictional engagements to be at least equal and preferably greater than the total reaction of the throttle actuating device measured on the surface wherein the free end of the pivoted lever contacts the sliding member, when simultaneously contacting the abutment surface.

2. A carburetor control system of an automotive vehicle comprising a linkage adapted to be connected to the throttle valve of a carburetor, a member adapted to be slid along the floor of the said vehicle, a flexible connection connecting the said member and said linkage, guide means provided for the said flexible connection, said flexible connection being trained over the said guide means, whereby when said member is slid, the said throttle valve is actuated.

3. A foot-operated carburetor control device to be used in combination with one of the levers of the carburetor control system of a throttle valve of an automotive vehicle, said device comprising a member adapted to be moved on the floor of the said vehicle, guide means to control the movements of the said member, flexible connecting means attached at one end to the said member and at the other end to one of the said levers, said flexible connecting means being trained over at least one part of the said guide means, whereby when the said member is moved by the foot of the driver, the said valve is actuated.

4. A device as set forth in claim 2 wherein the said member adapted to be slid along the floor of the said vehicle has the form of a roller, fixation means provided on the said roller to which fixation means the said flexible connection is secured freely so that when the roller is slid and rotated, the said flexible connection does not wind around the said roller.

5. A device as set forth in claim 2 wherein the said member adapted to be slid along the floor of the said vehicle has the form of a roller, fixation means provided on the said roller to which fixation means the said flexible connection is secured rigidly.

6. A device as set forth in claim 3 provided with an opening in the flooring through which the said fixation connection passes, the said member being slid over the said opening and having a width larger than the width of the said opening.

7. A device as set forth in claim 3 wherein on the top of the said member is mounted a rigid plate affixed to the flooring, the said member being provided with arresting means slightly rising through the opening provided in the said plate.

8. A device as set forth in claim 3 wherein the said member is provided with guide means which control its movement.

9. A device as set forth in claim 3 wherein the said member is covered at least in one part by friction increasing means.

10. A device as set forth in claim 3 wherein the said member is engaged between a lever of the said carburetor control system and the said guide means rigidly affixed to the flooring.

GEORGE ALEXIS RUBISSOW.